(12) United States Patent
Jower

(10) Patent No.: US 9,770,666 B1
(45) Date of Patent: Sep. 26, 2017

(54) TRAVELKINZ APP SYSTEM AND METHOD

(71) Applicant: Jason Jower, Discovery Bay, CA (US)

(72) Inventor: Jason Jower, Discovery Bay, CA (US)

( * ) Notice: Subject to any disclaimer, the term of this patent is extended or adjusted under 35 U.S.C. 154(b) by 0 days.

(21) Appl. No.: 15/252,185

(22) Filed: Aug. 30, 2016

(51) Int. Cl.
| | |
|---|---|
| *H04M 3/42* | (2006.01) |
| *A63H 3/00* | (2006.01) |
| *H04W 76/02* | (2009.01) |
| *H04W 4/16* | (2009.01) |
| *H04M 1/725* | (2006.01) |
| *H04M 3/53* | (2006.01) |
| *A63H 3/28* | (2006.01) |
| *H04W 88/02* | (2009.01) |
| *H04W 4/00* | (2009.01) |

(52) U.S. Cl.
CPC ............. *A63H 3/003* (2013.01); *A63H 3/006* (2013.01); *A63H 3/28* (2013.01); *H04M 1/72583* (2013.01); *H04M 3/5307* (2013.01); *H04W 4/16* (2013.01); *H04W 76/022* (2013.01); *A63H 2200/00* (2013.01); *H04W 4/008* (2013.01); *H04W 88/02* (2013.01)

(58) Field of Classification Search
CPC ...... A63H 2200/00; A63H 3/28; A63H 33/26; A63H 30/04; A63H 3/006; A63H 3/36; A63H 33/00; A63H 33/22; A63H 3/003; A63H 3/365; A63H 11/10; A63H 13/00; A63H 3/02; A63H 9/00; H04L 63/0861
USPC .......... 455/414.1, 3.06, 426.1; 446/175, 268, 446/397, 137, 219, 72
See application file for complete search history.

(56) References Cited

U.S. PATENT DOCUMENTS

2011/0001892 A1    1/2011    Gay
2013/0249467 A1    9/2013    Varghese

*Primary Examiner* — Fred Casca
(74) *Attorney, Agent, or Firm* — Integrity Patent Group, PLC; Edwin Wold

(57) ABSTRACT

A travelkinz mobile application as used to improve the communication between youngsters and loved ones.

14 Claims, 4 Drawing Sheets

TRAVELKINZ APP SYSTEM AND METHOD

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. FIELD OF THE INVENTION

The present invention relates generally to the field of mobile applications (apps) and more specifically relates to a travelkinz mobile application.

2. DESCRIPTION OF RELATED ART

A mobile app is a computer program designed to run on smartphones, tablet computers and other mobile devices. Mobile apps were originally offered for general productivity and information retrieval, including email, calendar, contacts, and stock market and weather information. However, public demand and the availability of developer tools drove rapid expansion into other categories, such as mobile games, factory automation, GPS and location-based services, banking, order-tracking, ticket purchases and recently mobile medical apps. The explosion in number and variety of apps made discovery a challenge, which in turn led to the creation of a wide range of review, recommendation, and curation sources, including blogs, magazines, and dedicated online app-discovery services. Many new apps are desirable to provide convenient solutions to the users.

Several attempts have been made to solve the above-mentioned problems such as those found in U.S. Pub. No. 2013/0249467 to Manosh Varghese, U.S. Pub. No. 2011/0001892 to Sharron C. Gay. This art is representative of mobile applications (apps). However, none of the above inventions and patents, taken either singly or in combination, is seen to describe the invention as claimed.

BRIEF SUMMARY OF THE INVENTION

In view of the foregoing disadvantages inherent in the known mobile applications (apps) art, the present invention provides a novel travelkinz mobile application. The general purpose of the present invention, which will be described subsequently in greater detail is to provide a communication tool to nurture feelings of a youngster when missing a loved one, entitled travelkinz mobile application.

A travelkinz mobile application is disclosed herein, in a preferred embodiment, comprising: a nurturing communication application system comprising a securing member having a cushioned main-body structured and arranged for securing a central-control-device into the cushioned main body. A first-transceiver and first-receiver embedded in the central-control-device and configured to communicate over a wireless communication link, and a memory is embedded in the central-control-device configured to store at least one nurturing communication. The system also comprises a portable-electronic-device having a second-transceiver and second-receiver embedded in a housing of the portable-electronic-device configured to communicate over the wireless communication link. The central-control-device and the portable-electronic-device are synced for communication therebetween via suitable means. A processor is embedded in the housing; the processor is configured to receive and transceive the at least one nurturing communication, to execute the at least one nurturing communication responsive to the user interaction with the user interface, to provide remote communication.

The portable-electronic-device is controlled via a software application having a menu and the portable-electronic-device comprises a smart phone. The central-control-device is in coupled communication with a heart and a smile. The heart is able to be illuminated via an illuminator when the communication occurs. The illuminator is able to intermittently flash; wherein the flash comprises a mimicked heart-beat. The at least one nurturing communication comprises the mimicked heart-beat of a loved-one such that the child-user is able to be comforted. The at least one nurturing communication may also comprise a recorded voice message.

The central-control-device in preferred embodiments is internally stored with an inner cavity of the securing member; wherein the central-control-device is internally stored within the inner cavity of the securing member and accessible via a zipping fastener or other suitable means. The software application is web-based for use by the smart phone. The flash and the recorded voice message are able to be communicated simultaneously; wherein the central-control-device comprises a speaker suitable to emit audible sounds.

The present invention holds significant improvements and serves as a travelkinz mobile application. Preferably, a mobile applications (apps) should provide a communication tool to nurture the natural feeling of missing a loved one and, yet would operate reliably and be manufactured at a modest expense. Thus, a need exists for a reliable a travelkinz mobile application to avoid the above-mentioned problems.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present disclosure, a travelkinz mobile application, constructed and operative according to the teachings of the present disclosure.

The various embodiments of the present invention will hereinafter be described in conjunction with the appended drawings, wherein like designations denote like elements.

DETAILED DESCRIPTION

Figure 1:
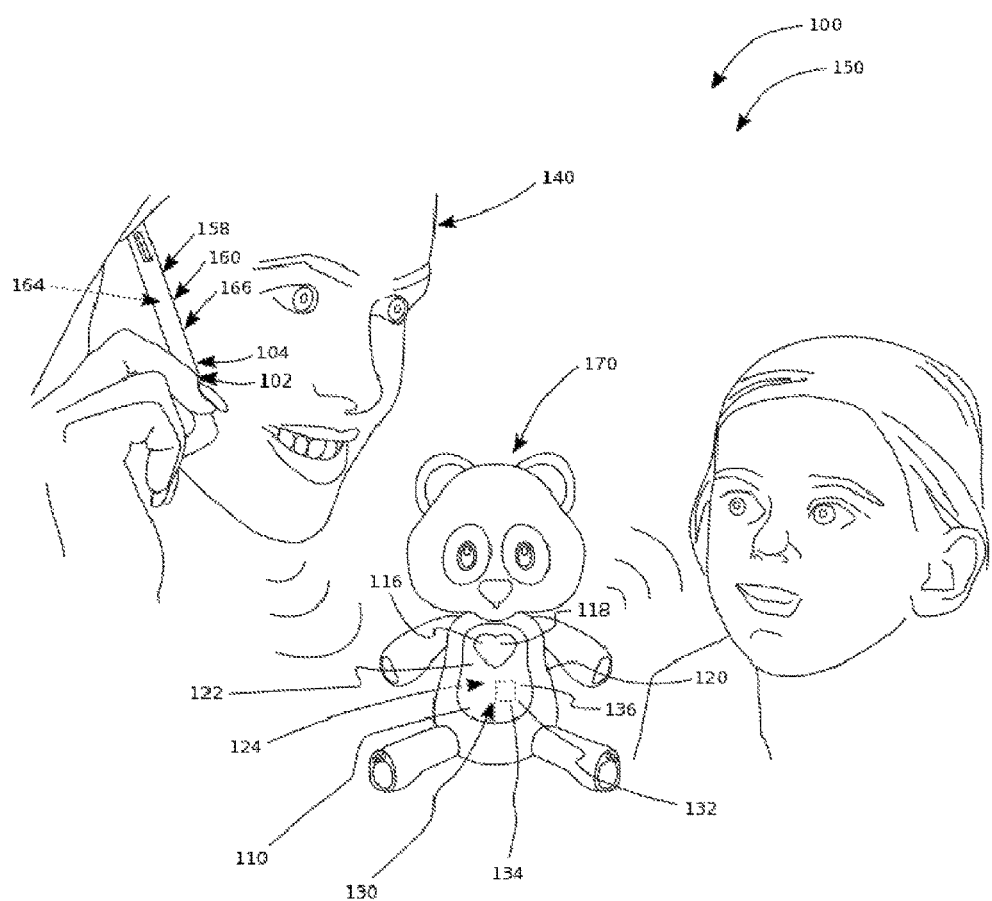
FIG. 1 shows a perspective view illustrating a travelkinz mobile application during an 'in-use' condition according to an embodiment of the disclosure.

As discussed above, embodiments of the present disclosure relate to a mobile application (apps) and more particularly to a travelkinz mobile application as used to improve the communication between individuals. Generally speaking, the present invention is designed to help parents, and loved ones communicate remotely with their child to nurture the child, despite the fact that they are remote from each other.

Referring now more specifically to the drawings by numerals of reference there is shown in FIGS. 1-4, various views of travelkinz mobile application 102 hereinafter referred to as nurturing communication application system 100 comprising: a securing member 110 having cushioned main-body 120 structured and arranged for releasably securing central-control-device 130 to cushioned main body 120 in central-control-receiver 122 (may be internal or external); first-transceiver 132 and first-receiver 134 embedded in central-control-device 130 and configured to communicate over a wireless communication link.

A memory is embedded in central-control-device 130 configured to store at least one nurturing communication. Portable-electronic-device 160 (user 140 shown communicating with a child in FIG. 1) has second-transceiver 162 and second-receiver 164 embedded in housing 166 of portable-electronic-device 160 configured to communicate over the wireless communication link. Central-control-device 130 and portable-electronic-device 160 are synced for communication therebetween. A processor is embedded in housing 166; the processor configured to receive and transceiver at the least one nurturing communication, to execute the at least one nurturing communication responsive to the user's 140 interaction with the user interface, to provide remote communication. Software application is web-based for use by smart phone 158 or other such suitable electronic device. Those with ordinary skill in the art will now appreciate that upon reading this specification and by their understanding the art of communication devices and communication between devices as described herein, methods of communication will be understood by those knowledgeable in such art.

Figure 2:
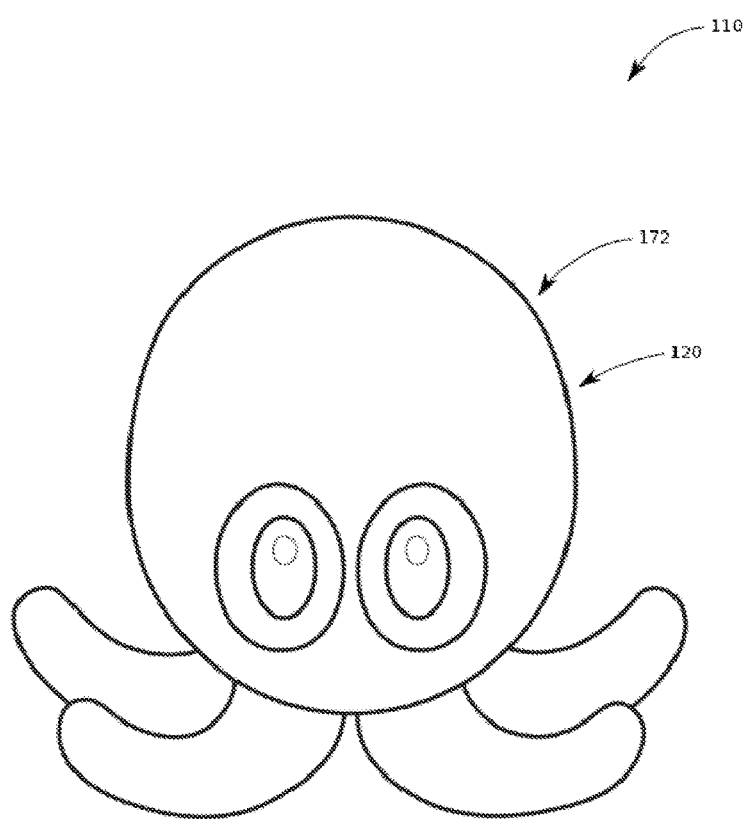
FIG. 2 is a perspective view illustrating the travelkinz mobile application comprising a first embodiment of the present invention of the disclosure.
Figure 3:
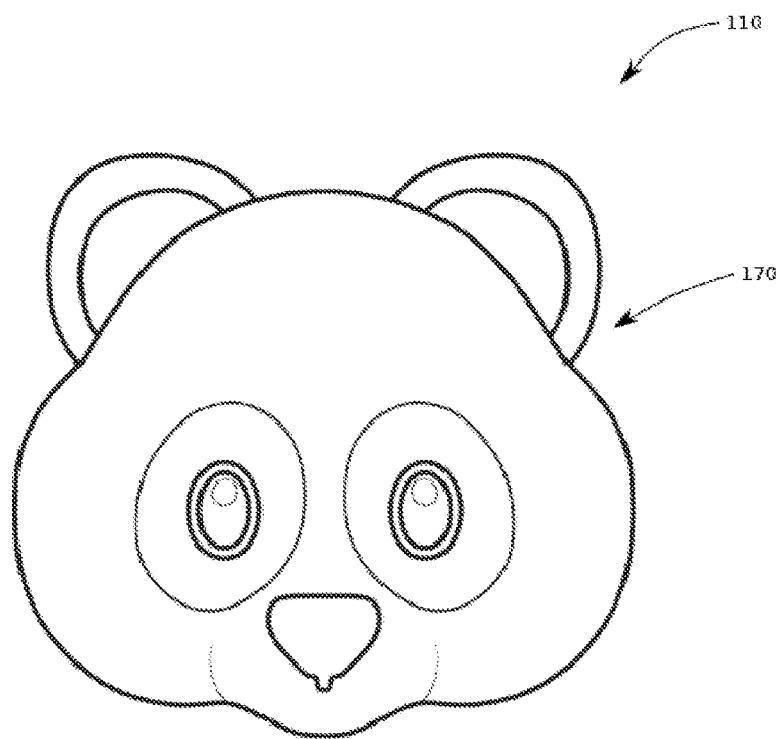
FIG. 3 is a perspective view illustrating the travelkinz mobile application comprising a second embodiment of the present invention of the disclosure.
Figure 4:
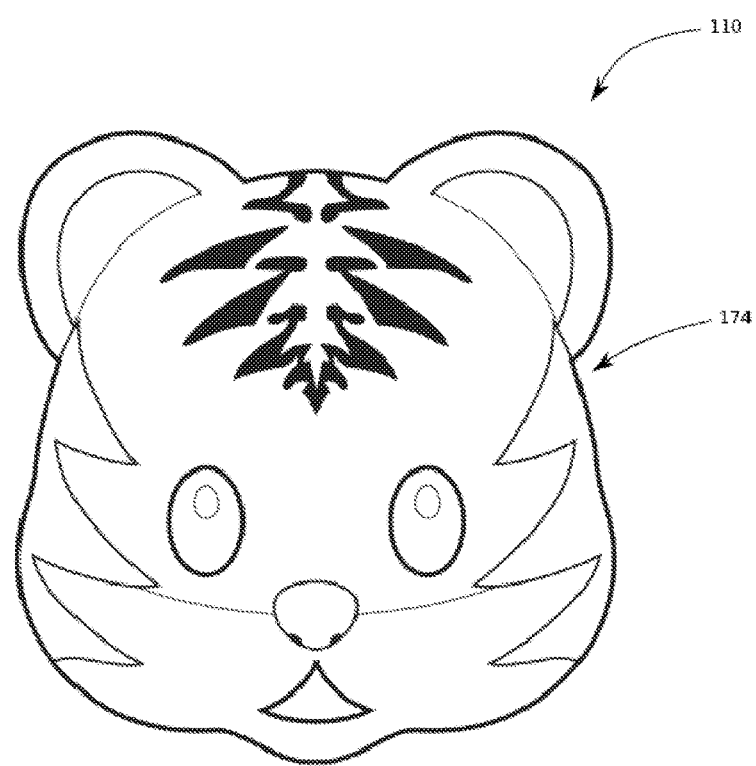
FIG. 4 is a perspective view illustrating the travelkinz mobile application comprising a third embodiment of the present invention of the disclosure.

Portable-electronic-device 160 is controlled via a software application having menu 104; wherein portable-electronic-device 160 may comprise a smart phone 158. Securing member 110 is selected from the group consisting of a stuffed bear 170, a stuffed octopus 172, and a stuffed tiger 174, as shown in FIGS. 2-4. Central-control-device 130 is in coupled communication with heart 118. Heart 118 is able to be illuminated via an illuminator 116 when the communication occurs. Illuminator 116 is able to intermittently flash; wherein the flash comprises a mimicked heart-beat. Central-control-device 130 is preferably internally stored with an inner cavity of securing member 110. The flash and the recorded voice message are able to be communicated simultaneously. The at least one nurturing communication comprises the mimicked heart-beat of a loved-one. The at least one nurturing communication may comprise a recorded voice message. Central-control-device 130 is internally stored with the inner cavity of securing member 110 and accessible via a zipping fastener 124.

Central-control-device 122 may be coupled communication with a smile. Smart phone 158 is able to be smart-phone-paired with a second-smart-phone. Central-control-device 122 comprises speaker 136 suitable to emit audible sounds. Securing member 110 is remote from portable-electronic-device 160 when used.

Nurturing communication application system 100 may be sold as a kit comprising the following parts: at least one cushioned main-body 120 with central-control-receiver 122; at least one smart phone 158; and at least one set of user instructions. The kit has instructions such that functional relationships are detailed in relation to the structure of the invention (such that the invention can be used, maintained, or the like in a preferred manner).

Nurturing communication application system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different animal characters and electronic communication means and combinations, parts may be sold separately, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A nurturing communication application system comprising: a securing member having;
    a cushioned main-body structured and arranged for releasably securing a central-control-device to said cushioned main body in a central-control-receiver;
    a first-transceiver and first-receiver embedded in said central-control-device and configured to communicate over a wireless communication link; and
    a memory embedded in said central-control-device, and configured to store at least one nurturing communication;
    a portable-electronic-device having,
    a second-transceiver and second-receiver embedded in a housing of said portable-electronic-device and configured to communicate over said wireless communication link; and
    wherein said central-control-device and said portable-electronic-device are synced for communication therebetween; and
    a processor embedded in said housing, said processor configured to receive and transceive said at least one nurturing communication, to
    execute said at least one nurturing communication responsive to said user interaction with said user interface, to provide remote said communication;

wherein said central-control-device is in coupled communication with a heart; wherein said heart is able to be illuminated via an illuminator when said communication occurs;
wherein said illuminator is able to intermittently flash;
wherein said flash comprises a mimicked heart-beat;
wherein said at least one nurturing communication comprises said mimicked heart-beat of a loved-one;
wherein a nurturing communication is transmitted by the second transceiver and received by the first receiver;
wherein a user sends the nurturing communication using the portable electronic device, and the nurturing communication is received by the securing member and the nurturing communication is output in an audio format.

2. The nurturing communication application system of claim 1 wherein said portable-electronic-device is controlled via a software application having a menu.

3. The nurturing communication application system of claim 2 wherein said portable-electronic-device comprises a smart phone.

4. The nurturing communication application system of claim 1 wherein said securing member is selected from the group consisting of a stuffed bear, a stuffed octopus, and a stuffed tiger.

5. The nurturing communication application system of claim 1 wherein said central-control-device is internally stored with an inner cavity of said securing member.

6. The nurturing communication application system of claim 1 wherein said at least one nurturing communication comprises a recorded voice message.

7. The nurturing communication application system of claim 5 wherein said central-control-device is internally stored with said inner cavity of said securing member and accessible via a zipping fastener.

8. The nurturing communication application system of claim 3 wherein said software application is web-based for use by said smart phone.

9. The nurturing communication application system of claim 6 wherein said flash and said recorded voice message are able to be communicated simultaneously.

10. The nurturing communication application system of claim 1 wherein said central-control-device is in coupled communication with a smile.

11. The nurturing communication application system of claim 8 wherein said smart phone is able to be smart-phone-paired with a second-smart-phone.

12. The nurturing communication application system of claim 1 wherein said central-control-device comprises a speaker suitable to emit audible sounds.

13. The nurturing communication application system of claim 1 wherein said securing member is remote from said portable-electronic-device.

14. A nurturing communication application system comprising: a securing member having;

a cushioned main-body structured and arranged for securing a central-control-device into said cushioned main body;
a first-transceiver and first-receiver embedded in said central-control-device and configured to communicate over a wireless communication link; and
a memory embedded in said central-control-device, and configured to store at least one nurturing communication;
a portable-electronic-device having,
a second-transceiver and second-receiver embedded in a housing of said portable-electronic-device and configured to communicate over said wireless communication link; and
wherein said central-control-device and said portable-electronic-device are synced for communication therebetween; and
a processor embedded in said housing, said processor configured to receive and transceive said at least one nurturing communication, to execute said at least one nurturing communication responsive to said user interaction with said user interface, to provide remote said communication;
wherein said portable-electronic-device is controlled via a software application having a menu;
wherein said portable-electronic-device comprises a smart phone;
wherein said central-control-device is in coupled communication with a heart and a smile;
wherein said heart is able to be illuminated via an illuminator when said communication occurs;
wherein said illuminator is able to intermittently flash;
wherein said flash comprises a mimicked heart-beat;
wherein said at least one nurturing communication comprises said mimicked heart-beat of a loved-one;
wherein said at least one nurturing communication comprises a recorded voice message; wherein said central-control-device is internally stored with an inner cavity of said securing member;
wherein said central-control-device is internally stored with said inner cavity of said securing member and accessible via a zipping fastener;
wherein said software application is web-based for use by said smart phone;
wherein said flash and said recorded voice message are able to be communicated simultaneously;
and wherein said central-control-device comprises a speaker suitable to emit audible sounds;
wherein a nurturing communication is transmitted by the second transceiver and received by the first receiver;
wherein a user sends the nurturing communication using the portable electronic device, and the nurturing communication is received by the securing member and the nurturing communication is output in an audio format.

* * * * *